A. JOHNSON.
Combined Shovel and Ash-Pan Lifter.
No. 161,044. Patented March 23, 1875.
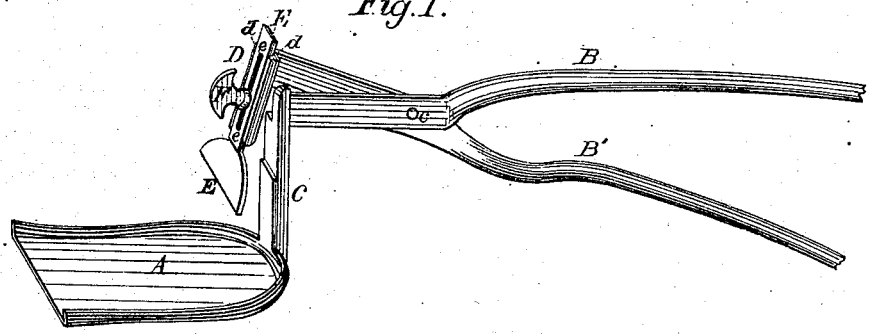
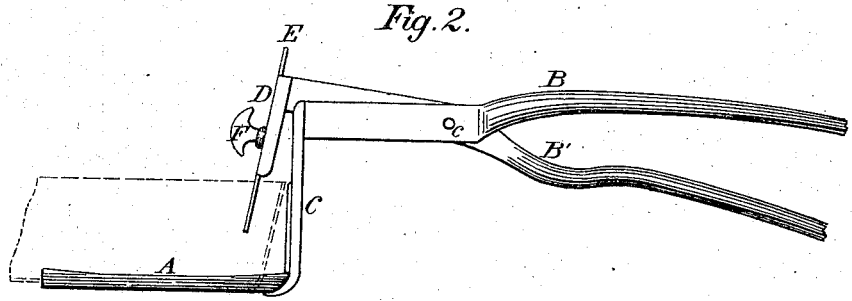
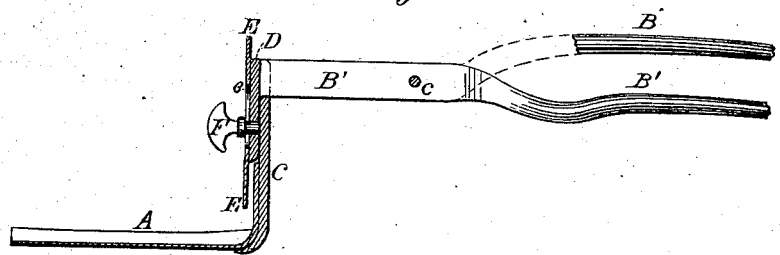

UNITED STATES PATENT OFFICE.

ANDREW JOHNSON, OF YOUNGSTOWN, OHIO.

IMPROVEMENT IN COMBINED SHOVELS AND ASH-PAN LIFTERS.

Specification forming part of Letters Patent No. 161,044, dated March 23, 1875; application filed January 30, 1875.

*To all whom it may concern:*

Be it known that I, ANDREW JOHNSON, of Youngstown, in the county of Mahoning and State of Ohio, have invented certain new and useful Improvements in Combined Fire-Shovel and Ash-Pan Lifter; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the combination of a fire-shovel with an ash-pan lifter, as hereinafter described.

On the drawing, Figure 1 is a perspective view. Fig. 2 shows the mode of grasping and lifting the ash-pan, and Fig. 3 is a longitudinal vertical section.

Similar letters of reference indicate corresponding parts in all the figures.

A is the shovel. B and B' are the tongs, which constitute the handle, and which are pivoted together by the pin $c$. The shovel A is secured to B by the downward-projecting arm C, as shown. B' has a downward-projecting arm, D, which has two projecting flanges, $d$, so as to form a guide for the sliding clamp E. This latter has a slot, $e$, so that it may be adjusted in its relation to the arm D by means of a set-screw, F.

The manner of using my improved combined fire-shovel and ash-pan lifter will be easily understood by reference to the drawing.

The shovel A is first inserted under the ash-pan, and the tongs are then grasped so that the edge of the pan will be caught between the arm C and the clamp E, when it may be readily lifted up and out. Where the side of the pan is comparatively low, the clamp E is lowered upon the arm D by loosening the set-screw and again adjusting it. If, on the other hand, the side of the pan is a high one, the clamp E is raised so as to enable it to pass over it while the shovel is being inserted.

Having thus described my invention, I claim and desire to secure by Letters Patent—

The combination of a fire-shovel, A, with the adjustable clamp E and the tongs B B', substantially as and for the purpose specified.

In testimony that I claim the foregoing as my own I have hereunto affixed my signature in presence of two witnesses.

ANDREW JOHNSON.

Witnesses:
 LOUIS BAGGER,
 WM. BAGGER.